United States Patent
Kajimura et al.

(10) Patent No.: US 10,491,815 B2
(45) Date of Patent: Nov. 26, 2019

(54) IMAGE-PROCESSING APPARATUS, IMAGE-PROCESSING METHOD, AND NON-TRANSITORY COMPUTER READABLE MEDIUM STORING IMAGE-PROCESSING PROGRAM

(71) Applicant: OLYMPUS CORPORATION, Hachioji-shi, Tokyo (JP)

(72) Inventors: Kosuke Kajimura, Tokyo (JP); Atsuro Okazawa, Tokyo (JP); Takeshi Fukutomi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 16/203,001

(22) Filed: Nov. 28, 2018

(65) Prior Publication Data
US 2019/0149728 A1 May 16, 2019

Related U.S. Application Data

(63) Continuation of application No. PCT/JP2017/040544, filed on Nov. 10, 2017.

(51) Int. Cl.
*H04N 5/232* (2006.01)
*H04N 5/349* (2011.01)
*H04N 9/04* (2006.01)

(52) U.S. Cl.
CPC ..... *H04N 5/23232* (2013.01); *H04N 5/23299* (2018.08); *H04N 5/349* (2013.01); *H04N 9/04551* (2018.08)

(58) Field of Classification Search
CPC ........... H04N 5/23232; H04N 5/23299; H04N 9/04551; H04N 5/349
(Continued)

(56) References Cited

U.S. PATENT DOCUMENTS 5,754,226 A * 5/1998 Yamada ................ G06T 3/4007
348/155
2005/0163398 A1 7/2005 Ioka
(Continued)

FOREIGN PATENT DOCUMENTS

EP 1640908 A1 3/2006
JP 2000209432 A 7/2000
(Continued)

OTHER PUBLICATIONS

International Search Report (ISR) and Written Opinion dated Jan. 30, 2018 issued in International Application No. PCT/JP2017/040544.

*Primary Examiner* — Sinh Tran
*Assistant Examiner* — Zhenzhen Wu
(74) *Attorney, Agent, or Firm* — Holtz, Holtz & Volek PC

(57) ABSTRACT

An image-processing apparatus includes a computer configured to: detect a positional-displacement amount between low-resolution images including a standard image and at least one reference image that are acquired in a time series; generate a high-resolution combined image by positioning, based on the positional-displacement amount detected, pixel information of the reference image at a standard-image position and by performing combining thereof in a high-resolution image space; evaluate a positioning error caused by a resolution-enhancement magnification used when positioning the reference image in the high-resolution image space when generating the high-resolution combined image; and correct the high-resolution combined image based on the evaluation result, wherein the correcting of the high-resolution combined image combines a high-resolution correction image generated by applying a filter to the high-resolution combined image based on the evaluation result (Continued)

obtained, and the high-resolution combined image in accordance with combining ratios based on the evaluation result.

12 Claims, 16 Drawing Sheets

(58) Field of Classification Search
USPC .................................................... 348/222.1
See application file for complete search history.

(56) References Cited

U.S. PATENT DOCUMENTS

| | | | |
|---|---|---|---|
| 2009/0033792 A1* | 2/2009 | Kano | H04N 5/145 348/441 |
| 2010/0067820 A1 | 3/2010 | Yano | |
| 2012/0113221 A1* | 5/2012 | Yamada | H04N 13/139 348/43 |
| 2012/0321185 A1* | 12/2012 | Toda | G06T 3/4053 382/167 |
| 2016/0373649 A1 | 12/2016 | Honda et al. | |

FOREIGN PATENT DOCUMENTS

| | | | |
|---|---|---|---|
| JP | 2004259232 A | 9/2004 |
| JP | 2004343222 A | 12/2004 |
| JP | 2008293185 A | 12/2008 |
| JP | 2011199786 A | 10/2011 |
| JP | 2016181023 A | 10/2016 |
| JP | 2017011329 A | 1/2017 |
| JP | 2017045273 A | 3/2017 |
| WO | 2008143360 A1 | 11/2008 |

* cited by examiner

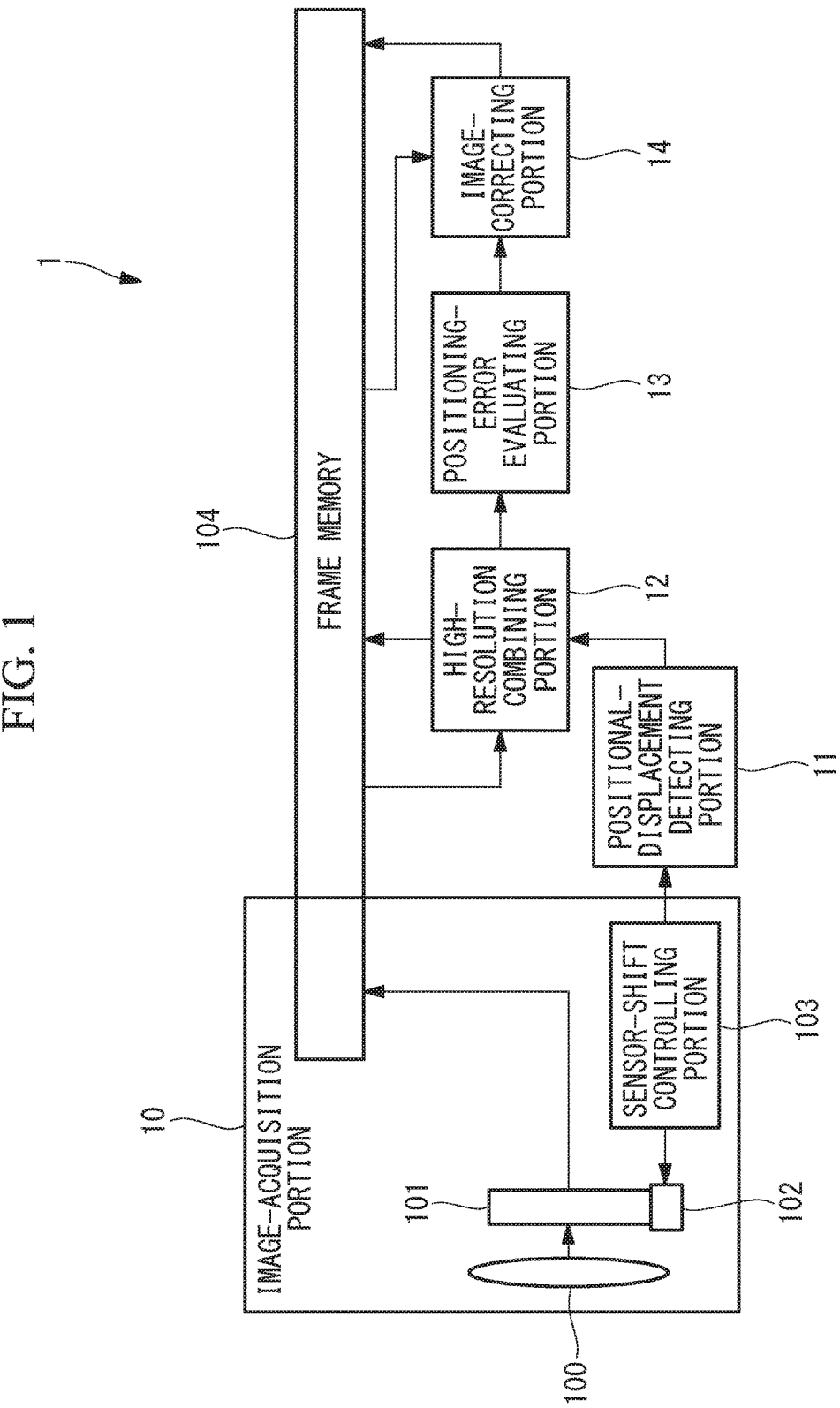

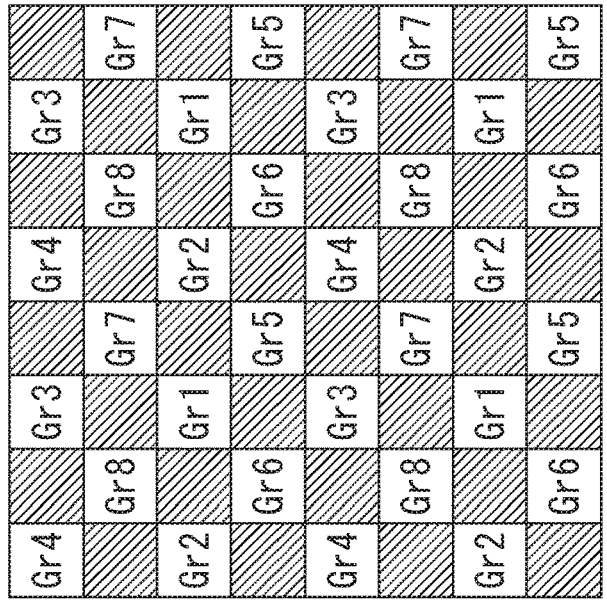
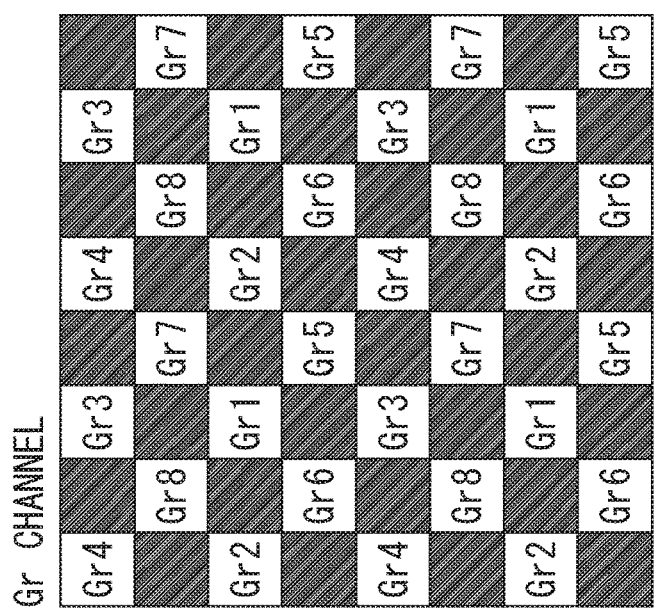
FIG. 2A

FIG. 2B

R CHANNEL

| R3 |    | R4 |    | R3 |    | R4 |    |
|    | R7 |    | R8 |    | R7 |    | R8 |
| R1 |    | R2 |    | R1 |    | R2 |    |
|    | R5 |    | R6 |    | R5 |    | R6 |
| R3 |    | R4 |    | R3 |    | R4 |    |
|    | R7 |    | R8 |    | R7 |    | R8 |
| R1 |    | R2 |    | R1 |    | R2 |    |
|    | R5 |    | R6 |    | R5 |    | R6 |

FIG. 2C

B CHANNEL

| B2 | | B1 | | B2 | | B1 | |
|----|----|----|----|----|----|----|----|
| | B6 | | B5 | | B6 | | B5 |
| B4 | | B3 | | B4 | | B3 | |
| | B8 | | B7 | | B8 | | B7 |
| B2 | | B1 | | B2 | | B1 | |
| | B6 | | B5 | | B6 | | B5 |
| B4 | | B3 | | B4 | | B3 | |
| | B8 | | B7 | | B8 | | B7 |

FIG. 2D

Gb CHANNEL

| Gb1 | | Gb2 | | Gb1 | | Gb2 | |
|-----|-----|-----|-----|-----|-----|-----|-----|
| | Gb5 | | Gb6 | | Gb5 | | Gb6 |
| Gb3 | | Gb4 | | Gb3 | | Gb4 | |
| | Gb7 | | Gb8 | | Gb7 | | Gb8 |
| Gb1 | | Gb2 | | Gb1 | | Gb2 | |
| | Gb5 | | Gb6 | | Gb5 | | Gb6 |
| Gb3 | | Gb4 | | Gb3 | | Gb4 | |
| | Gb7 | | Gb8 | | Gb7 | | Gb8 |

FIG. 3
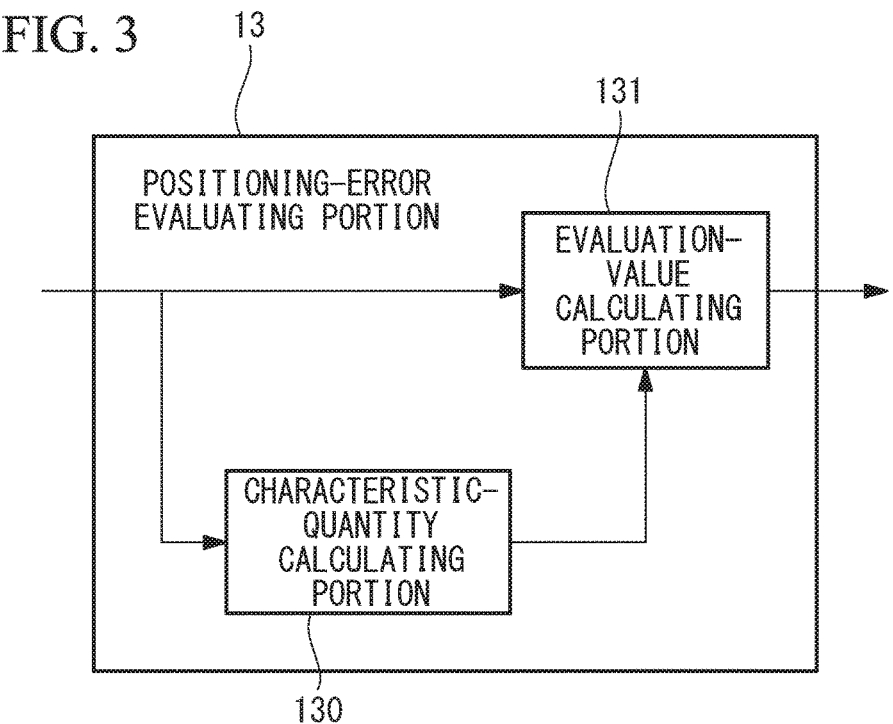
FIG. 4A
| G00 | G01 | G02 |
| --- | --- | --- |
| G10 | G11 | G12 |
| G20 | G21 | G22 |
FIG. 4B
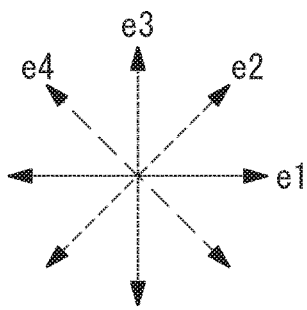

FIG. 5
HIGH-RESOLUTION Gr CHANNEL
| Gr00 | Gr01 | Gr02 | Gr03 | Gr04 | Gr05 | Gr06 | Gr07 | Gr08 |
|------|------|------|------|------|------|------|------|------|
| Gr10 | Gr11 | Gr12 | Gr13 | Gr14 | Gr15 | Gr16 | Gr17 | Gr18 |
| Gr20 | Gr21 | Gr22 | Gr23 | Gr24 | Gr25 | Gr26 | Gr27 | Gr28 |
| Gr30 | Gr31 | Gr32 | Gr33 | Gr34 | Gr35 | Gr36 | Gr37 | Gr38 |
| Gr40 | Gr41 | Gr42 | Gr43 | Gr44 | Gr45 | Gr46 | Gr47 | Gr48 |
| Gr50 | Gr51 | Gr52 | Gr53 | Gr54 | Gr55 | Gr56 | Gr57 | Gr58 |
| Gr60 | Gr61 | Gr62 | Gr63 | Gr64 | Gr65 | Gr66 | Gr67 | Gr68 |
| Gr70 | Gr71 | Gr72 | Gr73 | Gr74 | Gr75 | Gr76 | Gr77 | Gr78 |
| Gr80 | Gr81 | Gr82 | Gr83 | Gr84 | Gr85 | Gr86 | Gr87 | Gr88 |
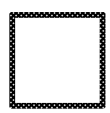 PIXEL-OF-INTEREST
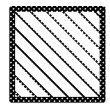 PIXEL SEPARATED BY FOUR PIXELS
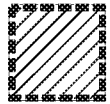 ADJACENT PIXEL

FIG. 6A e1-DIRECTION FILTER

| 0 | 0 | 0 | 0 | 0 |
|---|---|---|---|---|
| 0 | 0 | 0 | 0 | 0 |
| 1/4 | 1/4 | 0 | 1/4 | 1/4 |
| 0 | 0 | 0 | 0 | 0 |
| 0 | 0 | 0 | 0 | 0 |

FIG. 6B e2-DIRECTION FILTER

| 0 | 0 | 0 | 0 | 1/4 |
|---|---|---|---|---|
| 0 | 0 | 0 | 1/4 | 0 |
| 0 | 0 | 0 | 0 | 0 |
| 0 | 1/4 | 0 | 0 | 0 |
| 1/4 | 0 | 0 | 0 | 0 |

FIG. 6C e3-DIRECTION FILTER

| 0 | 0 | 1/4 | 0 | 0 |
|---|---|---|---|---|
| 0 | 0 | 1/4 | 0 | 0 |
| 0 | 0 | 0 | 0 | 0 |
| 0 | 0 | 1/4 | 0 | 0 |
| 0 | 0 | 1/4 | 0 | 0 | e4-DIRECTION FILTER

| 1/4 | 0   | 0 | 0   | 0   |
|-----|-----|---|-----|-----|
| 0   | 1/4 | 0 | 0   | 0   |
| 0   | 0   | 0 | 0   | 0   |
| 0   | 0   | 0 | 1/4 | 0   |
| 0   | 0   | 0 | 0   | 1/4 |

NO DIRECTION FILTER

| 0 | 0 | 0 | 0 | 0 |
|---|---|---|---|---|
| 0 | 0 | 0 | 0 | 0 |
| 0 | 0 | 1 | 0 | 0 |
| 0 | 0 | 0 | 0 | 0 |
| 0 | 0 | 0 | 0 | 0 |

FIG. 9

HIGH-RESOLUTION Gr CHANNEL

| | | | | | | | | | | | |
|---|---|---|---|---|---|---|---|---|---|---|---|
| 15 | 10 | 39 | 40 | 65 | 102 | 180 | 182 | 177 | 178 | 180 | 180 |
| 11 | 16 | 12 | 42 | 70 | 104 | 100 | 180 | 174 | 180 | 177 | 180 |
| 10 | 13 | 38 | 40 | 71 | 103 | 180 | 176 | 180 | 180 | 176 | 180 |
| 11 | 10 | 35 | 45 | 71 | 100 | 179 | 182 | 181 | 180 | 180 | 185 |
| 14 | 12 | 40 | 39 | 70 | 79 | 177 | 180 | 183 | 180 | 186 | 180 |
| 9 | 10 | 10 | 40 | 68 | 101 | 100 | 182 | 180 | 176 | 180 | 180 |
| 8 | 10 | 40 | 44 | 70 | 100 | 180 | 180 | 179 | 180 | 182 | 180 |
| 8 | 9 | 44 | 43 | 74 | 100 | 181 | 173 | 180 | 180 | 180 | 180 |
| 7 | 11 | 38 | 42 | 73 | 99 | 172 | 180 | 181 | 180 | 185 | 179 |
| 10 | 15 | 10 | 40 | 68 | 100 | 101 | 180 | 180 | 176 | 180 | 186 |
| 13 | 11 | 40 | 39 | 70 | 105 | 175 | 182 | 180 | 181 | 182 | 180 |
| 10 | 9 | 35 | 38 | 72 | 100 | 176 | 180 | 186 | 180 | 180 | 181 |

200

FIG. 11A
HIGH-RESOLUTION Gr CHANNEL
| Gr00 | Gr01 | Gr02 | Gr03 | Gr04 | Gr05 | Gr06 | Gr07 | Gr08 |
|------|------|------|------|------|------|------|------|------|
| Gr10 | Gr11 | Gr12 | Gr13 | Gr14 | Gr15 | Gr16 | Gr17 | Gr18 |
| Gr20 | Gr21 | Gr22 | Gr23 | Gr24 | Gr25 | Gr26 | Gr27 | Gr28 |
| Gr30 | Gr31 | Gr32 | Gr33 | Gr34 | Gr35 | Gr36 | Gr37 | Gr38 |
| Gr40 | Gr41 | Gr42 | Gr43 | Gr44 | Gr45 | Gr46 | Gr47 | Gr48 |
| Gr50 | Gr51 | Gr52 | Gr53 | Gr54 | Gr55 | Gr56 | Gr57 | Gr58 |
| Gr60 | Gr61 | Gr62 | Gr63 | Gr64 | Gr65 | Gr66 | Gr67 | Gr68 |
| Gr70 | Gr71 | Gr72 | Gr73 | Gr74 | Gr75 | Gr76 | Gr77 | Gr78 |
| Gr80 | Gr81 | Gr82 | Gr83 | Gr84 | Gr85 | Gr86 | Gr87 | Gr88 |
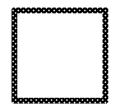 PIXEL-OF-INTEREST
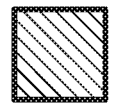 PIXEL SEPARATED BY FOUR PIXELS

FIG. 11B
HIGH-RESOLUTION Gb CHANNEL
| Gb00 | Gb01 | Gb02 | Gb03 | Gb04 | Gb05 | Gb06 | Gb07 | Gb08 |
|------|------|------|------|------|------|------|------|------|
| Gb10 | Gb11 | Gb12 | Gb13 | Gb14 | Gb15 | Gb16 | Gb17 | Gb18 |
| Gb20 | Gb21 | Gb22 | Gb23 | Gb24 | Gb25 | Gb26 | Gb27 | Gb28 |
| Gb30 | Gb31 | Gb32 | Gb33 | Gb34 | Gb35 | Gb36 | Gb37 | Gb38 |
| Gb40 | Gb41 | Gb42 | Gb43 | Gb44 | Gb45 | Gb46 | Gb47 | Gb48 |
| Gb50 | Gb51 | Gb52 | Gb53 | Gb54 | Gb55 | Gb56 | Gb57 | Gb58 |
| Gb60 | Gb61 | Gb62 | Gb63 | Gb64 | Gb65 | Gb66 | Gb67 | Gb68 |
| Gb70 | Gb71 | Gb72 | Gb73 | Gb74 | Gb75 | Gb76 | Gb77 | Gb78 |
| Gb80 | Gb81 | Gb82 | Gb83 | Gb84 | Gb85 | Gb86 | Gb87 | Gb88 |
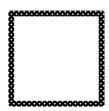 PIXEL-OF-INTEREST
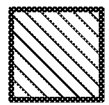 PIXEL SEPARATED BY FOUR PIXELS

FIG. 12B

Gb CHANNEL

| | | 40 | 39 | 71 | 101 | 173 | 184 | 176 | 179 | 181 | 180 |
|---|---|---|---|---|---|---|---|---|---|---|---|
| 10 | 14 | 44 | 40 | 68 | 100 | 177 | 176 | 189 | 182 | 179 | 172 |
| 9 | 11 | 38 | 42 | 70 | 101 | 176 | 177 | 186 | 171 | 178 | 178 |
| 14 | 8 | 10 | 40 | 73 | 104 | 100 | 180 | 181 | 180 | 186 | 180 |
| 8 | 14 | 42 | 45 | 70 | 100 | 176 | 181 | 185 | 182 | 183 | 184 |
| 10 | 11 | 44 | 36 | 66 | 100 | 181 | 180 | 182 | 188 | 180 | 180 |
| 13 | 13 | 41 | 40 | 75 | 104 | 180 | 181 | 180 | 179 | 176 | 174 |
| 13 | 9 | 10 | 46 | 70 | 101 | 102 | 176 | 180 | 177 | 184 | 180 |
| 12 | 14 | 40 | 43 | 67 | 100 | 178 | 173 | 183 | 180 | 180 | 185 |
| 12 | 10 | 42 | 37 | 70 | 98 | 170 | 181 | 179 | 178 | 180 | 180 |
| 10 | 12 | 44 | 42 | 71 | 100 | 170 | 185 | 177 | 180 | 179 | 180 |
| 11 | 10 | 15 | 40 | 69 | 104 | 100 | 179 | 182 | 171 | 182 | 180 |

302 — (dashed square around 66)
300 — (circle around 102)
301

FIG. 13A

| 661 | 655 | 655 | 553 |
|---|---|---|---|
| 746 | 746 | 746 | 619 |
| 630 | 629 | 634 | 527 |
| 720 | 720 | 728 | 600 |

302 — (dashed box at 746, top-left area)
300 — (circle at 728)

FIG. 13B

| 697 | 670 | 697 | 583 |
|---|---|---|---|
| 746 | 767 | 1427 | 640 |
| 651 | 662 | 661 | 542 |
| 747 | 747 | 1430 | 618 |

302 — (dashed box at 746)
300 — (circle at 1430)

IMAGE-PROCESSING APPARATUS, IMAGE-PROCESSING METHOD, AND NON-TRANSITORY COMPUTER READABLE MEDIUM STORING IMAGE-PROCESSING PROGRAM

CROSS-REFERENCE TO RELATED APPLICATIONS

This is a continuation of International Application PCT/JP2017/040544, with an international filing date of Nov. 10, 2017, which is hereby incorporated by reference herein in its entirety.

TECHNICAL FIELD

The present invention relates to an image-processing apparatus, an image-processing method, and image-processing program.

BACKGROUND ART

In the related art, there is a known technique in which correlations among a plurality of images are calculated and the images are combined by controlling, on the basis of the correlations, the ratios at which the images are combined (for example, see Patent Literature 1). In this technique, one of the plurality of captured images is used as a standard image, the other images are used as reference images, and correlations (differences) are calculated between the standard image and the reference images for individual regions therein; and the combining ratios of the reference images are controlled so as to be increased with an increase in the correlations, and the combining ratios of the reference images are controlled so as to be decreased (the ratio of the standard image is increased) with a decrease in the correlations.

Specifically, the regions having high correlations are determined to be regions in which positioning errors are low and correction processing is not performed therefor, and the regions having low correlations are determined to be regions having positioning errors and a high-resolution image is subjected to correction processing, such as filtering processing or the like, thus correcting irregular positioning-displacement artifacts.

On the other hand, in the case in which a high-resolution image is acquired by combining a plurality of low-resolution images, it is important to place information (pixels) in the plurality of low-resolution images at appropriate positions in an image space having a greater resolution than those of the low-resolution images, and it is not possible to achieve a resolution-enhancement effect when placement at the appropriate positions fails.

CITATION LIST

Patent Literature

{PTL 1} Japanese Unexamined Patent Application, Publication No. 2011-199786

SUMMARY OF INVENTION

An aspect of the present invention is directed to an image-processing apparatus including: a computer, wherein the computer is configured to: detect a positional-displacement amount between a plurality of low-resolution images including a standard image and at least one reference image that are acquired in a time series; generate a high-resolution combined image by positioning, on the basis of the positional-displacement amount detected, pixel information of the reference image at a standard-image position and by performing combining thereof in a high-resolution image space; evaluate a positioning error caused by a resolution-enhancement magnification used when positioning the reference image in the high-resolution image space when generating the high-resolution combined image; and correct the high-resolution combined image on the basis of the evaluation result, wherein the correcting of the high-resolution combined image combines a high-resolution correction image generated by applying a filter to the high-resolution combined image on the basis of the evaluation result obtained, and the high-resolution combined image in accordance with combining ratios based on the evaluation result.

In addition, another aspect of the present invention is directed to an image-processing method including: a positional-displacement detecting step of detecting a positional-displacement amount between a plurality of low-resolution images including a standard image and at least one reference image that are acquired in a time series; a high-resolution combining step of generating a high-resolution combined image by positioning, on the basis of the positional-displacement amount detected in the positional-displacement detecting step, pixel information of the reference image at a standard-image position and by performing combining thereof in a high-resolution image space; a positioning-error evaluating step of evaluating a positioning error caused by a resolution-enhancement magnification used when positioning the reference image in the high-resolution image space when generating the high-resolution combined image in the high-resolution combining step; and an image-correcting step of correcting the high-resolution combined image on the basis of the evaluation result in the positioning-error evaluating step, wherein, in the image-correcting step, a high-resolution correction image generated by applying a filter to the high-resolution combined image on the basis of the evaluation result obtained in the positioning-error evaluating step, and the high-resolution combined image are combined in accordance with combining ratios based on the evaluation result.

In addition, another aspect of the present invention is directed to a non-transitory computer readable medium storing an image-processing program that causes a computer to execute image processing including: a positional-displacement detecting step of detecting a positional-displacement amount between a plurality of low-resolution images including a standard image and at least one reference image that are acquired in a time series; a high-resolution combining step of generating a high-resolution combined image by positioning, on the basis of the positional-displacement amount detected in the positional-displacement detecting step, pixel information of the reference image at a standard-image position and by performing combining thereof in a high-resolution image space; a positioning-error evaluating step of evaluating a positioning error caused by a resolution-enhancement magnification used when positioning the reference image in the high-resolution image space when generating the high-resolution combined image in the high-resolution combining step; and an image correcting step of correcting the high-resolution combined image on the basis of the evaluation result in the positioning-error evaluating step, wherein, in the image-correcting step, a high-resolution correction image generated by applying a filter to the high-resolution combined image on the basis of the evaluation result obtained in the positioning-error evaluating step, and the high-resolution combined image in accordance with combining ratios based on the evaluation result.

BRIEF DESCRIPTION OF DRAWINGS

FIG. 1 is an overall configuration diagram showing an image-processing apparatus according to a first embodiment of the present invention.

FIG. 2A is a diagram showing an example of a Gr-channel high-resolution combined image generated by the image-processing apparatus in FIG. 1.

FIG. 2B is a diagram showing an example of an R-channel high-resolution combined image generated by the image-processing apparatus in FIG. 1.

FIG. 2C is a diagram showing an example of a B-channel high-resolution combined image generated by the image-processing apparatus in FIG. 1.

FIG. 2D is a diagram showing an example of a Gb-channel high-resolution combined image generated by the image-processing apparatus in FIG. 1.

FIG. 3 is a block diagram showing a positioning-error evaluating portion of the image-processing apparatus in FIG. 1.

FIG. 4A is a diagram showing a G-channel high-resolution image in which the Gr-channel and Gb-channel high-resolution combined images generated by the image-processing apparatus in FIG. 1 are arithmetically averaged.

FIG. 4B is a diagram showing directions in which edges are present in the high-resolution image in FIG. 4A.

FIG. 5 is a diagram showing an example of the Gr-channel high-resolution combined image in which an example of an evaluation-value calculation performed by the image-processing apparatus in FIG. 1 is shown.

FIG. 6A is a diagram showing an example of a direction filter for an edge direction e1 in FIG. 4B.

FIG. 6B is a diagram showing an example of a direction filter for an edge direction e2 in FIG. 4B.

FIG. 6C is a diagram showing an example of a direction filter for an edge direction e3 in FIG. 4B.

FIG. 9 is a diagram showing specific example values of positioning-error evaluation performed for the Gr channel of a high-resolution combined image generated by the image-processing apparatus in FIG. 1.

FIG. 11A is a diagram showing an example of a Gr-channel high-resolution combined image generated by an image-processing apparatus according to a second embodiment of the present invention.

FIG. 11B is a diagram showing an example of a Gb-channel high-resolution combined image generated by the image-processing apparatus in FIG. 11A.

FIG. 12B is a diagram showing a Gb-channel high-resolution combined image that is similar to FIG. 12A.

FIG. 13A is a diagram showing a comparative example of an SAD calculated in accordance with the conventional method by using a 9×9-pixel region 301 centered on a pixel-of-interest 300 in FIGS. 12A and 12B.

FIG. 13B is a diagram showing an SAD calculated by the image-processing apparatus in FIG. 11A by using the 9×9 pixel region 301 centered on the pixel-of-interest 300 in FIGS. 12A and 12B.

DESCRIPTION OF EMBODIMENTS

Figures 6D, 6E, 7:
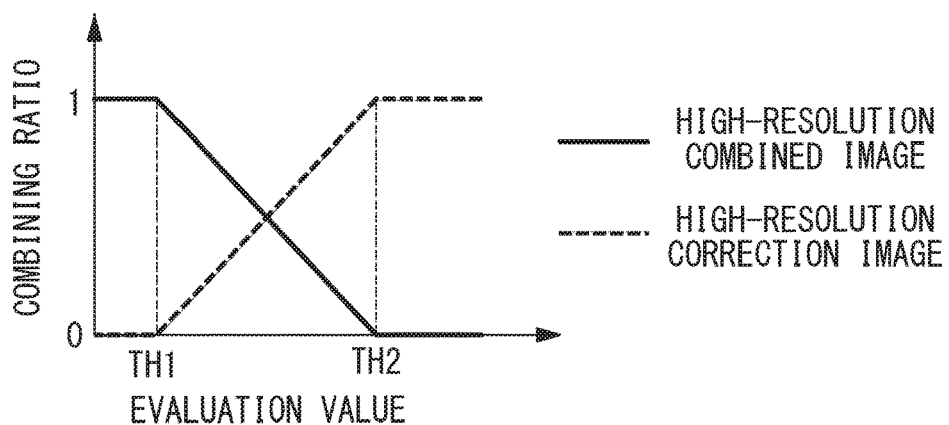
FIG. 6D is a diagram showing an example of a direction filter for an edge direction e4 in FIG. 4B.
FIG. 6E is a diagram showing an example of a direction filter for "no direction" of the edges in FIG. 4B.
FIG. 7 is a diagram showing an example of the relationship between the combining ratio and the evaluation value for a high-resolution combined image and a high-resolution correction image generated by an image-correcting portion of the image-processing apparatus in FIG. 1.

An image-processing apparatus 1 and an image-processing method according to a first embodiment of the present invention will be described below with reference to the drawings.

As shown in FIG. 1, the image-processing apparatus 1 according to this embodiment is provided with: an image-acquisition portion 10 that captures an imaging subject and acquires an image thereof; a positional-displacement detecting portion 11; a high-resolution combining portion 12; a positioning-error evaluating portion 13; and an image-correcting portion 14.

The image-acquisition portion 10 is provided with: an imaging lens (optical system) 100 that collects light coming from the imaging subject; an imaging device 101 that captures the light collected by the imaging lens 100; a sensor shifting mechanism 102 that shifts the imaging device 101 in a direction that is orthogonal to the optical axis; a sensor-shift controlling portion 103 that controls the sensor shifting mechanism 102; and a frame memory 104.

The frame memory 104 can be accessed from portions other than the image-acquisition portion 10.

The imaging lens 100 collects the light coming from the imaging subject and forms an optical image of the imaging subject on an imaging surface of the imaging device 101. The imaging device 101 has, for example, a so-called Byer array structure in which four types of color filters, namely, R, Gr, Gb, and B, are disposed at individual pixels in a 2×2 pixel unit.

A plurality of images (low-resolution images) acquired in a time series by the imaging device 101 are stored in the frame memory 104 such that the first acquired image serves as a standard image and one or more images acquired thereafter serve as reference images.

In addition, the sensor shifting mechanism 102 has a mechanism that is capable of shifting the imaging device 101, in sub-pixel units, in directions orthogonal to the optical axis and horizontal and vertical with respect to each other The sensor-shift controlling portion 103 controls shifting directions and shifting amounts by which the imaging device 101 is shifted via the sensor shifting mechanism 102. In addition, the sensor-shift controlling portion 103 outputs the information about the shifting directions and shifting amounts to the positional-displacement detecting portion 11. The positional-displacement detecting portion 11 calculates positional-displacement amounts on the basis of the information about the shifting directions and shifting amounts transmitted thereto from the sensor-shift controlling portion 103 and outputs the positional-displacement amounts to the high-resolution combining portion 12.

The high-resolution combining portion 12 places pixel information in the plurality of low-resolution images in a high-resolution image space for separate color channels (R, Gr, Gb, and B) while performing positioning thereof on the basis of the plurality of low-resolution images stored in the frame memory 104 and the positional-displacement amounts output thereto from the positional-displacement detecting portion 11.

Specifically, first, pixels of the standard image are placed in the high-resolution image space; next, by using the positional-displacement amount between the standard image and one reference image, calculated by the positional-displacement detecting portion 11, pixels of the reference image are placed at predetermined positions that are moved with respect to the standard image. When placing the pixels of the reference image, if pixels having the same color as the pixels to be placed are already placed in the pixels of the standard image or pixels of another subject image, it is not necessary to newly place the pixels, and the pixel values may be updated by taking an arithmetic average of the new pixels and the pixels having the same color that are already in place, or the pixel values may be cumulatively added and subsequently averaged for the number of times addition was performed.

Furthermore, after placing all of the pixels of the low-resolution images in the high-resolution image space, the high-resolution combining portion 12 performs processing for filling spaces in which the pixels have not been placed by means of interpolation. Regarding the interpolation method, for example, direction discrimination interpolation, in which edge directions are taken into consideration by using pixels that are placed in the surrounding areas, may be applied, interpolation may be performed by using a weighted average calculated by using the surrounding 5×5 pixels, or interpolation may be performed by copying the nearest neighbor pixels.

FIGS. 2A to 2D show images of a high-resolution combined image. This embodiment will be described in terms of a case in which eight low-resolution images acquired in a time series are combined, thus generating a high-resolution image having twice (M=2) the number of pixels vertically and horizontally.

FIG. 2A shows: a diagram in which only the Gr channel of the eight low-resolution images is placed in the high resolution space; on the left side of the arrow, the high resolution space that includes pixels at which the pixel information is not placed (pixels indicated by dense diagonal lines in the figure); and, on the right side of the arrow, the high resolution space in which the pixels at which the pixel information is not placed (pixels indicated by dense diagonal lines in the figure) have been filled by means of interpolation.

In the case of the Bayer array, in addition to the Gr channel shown in FIG. 2A, an R channel shown in FIG. 2B, a B channel shown in FIG. 2C, and a Gb channel shown in FIG. 2D are present. The numbers shown after the letters indicating the respective channels in the figures indicate the order in which the plurality of images were captured, and, in the case of this example, because the Bayer array is used, the capturing order (pixel-value acquisition timings) of the respective channels is different even if the coordinate positions are the same.

Sensor shift control performed while capturing the images in the case in which the image capturing results in the pixel placement shown in FIG. 2A will be described below.

Specifically, the sensor-shift controlling portion 103 shifts the imaging device 101 by using the position of the first standard image as a standard such that the second reference image is captured by shifting the imaging device 101 one pixel in the horizontal direction, and zero pixels in the vertical direction, the third reference image is captured by shifting the imaging device 101 zero pixels in the horizontal direction and one pixel in the vertical direction, the fourth reference image is captured by shifting the imaging device 101 one pixel in the horizontal direction and one pixel in the vertical direction, the fifth reference image is captured by shifting the imaging device 101 0.5 pixels in the horizontal direction and 0.5 pixels in the vertical direction, the sixth reference image is captured by shifting the imaging device 101 1.5 pixels in the horizontal direction and 0.5 pixels in the vertical direction, the seventh reference image is captured by shifting the imaging device 101 0.5 pixels in the horizontal direction and 1.5 pixels in the vertical direction, and the eighth reference image is captured by shifting the imaging device 101 1.5 pixels in the horizontal direction and 1.5 pixels in the vertical direction.

As shown in FIG. 3, the positioning-error evaluating portion 13 is provided with: a characteristic-quantity calculating portion 130; and an evaluation-value calculating portion 131 that calculates an evaluation value (error evaluation value) on the basis of a characteristic quantity calculated by the characteristic-quantity calculating portion 130.

The characteristic-quantity calculating portion 130 calculates the characteristic quantity by using the high-resolution combined image generated by the high-resolution combining portion 12.

FIGS. 4A and 4B show examples of calculation of the characteristic quantity performed by the characteristic-quantity calculating portion 130.

In this example, a G-channel image is generated by arithmetically averaging the Gr channel and the Gb channel of the high-resolution combined image, and edge-direction information is calculated on the basis of 3×3 pixels centered on a pixel-of-interest.

FIG. 4A shows a G-channel image in which the Gr channel and the Gb channel are arithmetically averaged, and FIG. 4B shows, with arrows, directions of edges that are present in the G-channel image in FIG. 4A.

In other words, values of edge information items e1, e2, e3, and e4 are calculated by using the expressions below, and the minimum value thereof is used as the edge-direction information for the pixel-of-interest position.

$$e1 = |G10 - G12|$$

$$e2 = |G20 - G02|$$

$$e3 = |G01 - G21|$$

$$e4 = |G00 - G22|$$

The evaluation-value calculating portion 131 calculates, on the basis of the high-resolution combined image generated by the high-resolution combining portion 12 and the edge-direction information (characteristic quantity) calculated by the characteristic-quantity calculating portion 130, an evaluation value for evaluating whether or not the pixel-of-interest is a pixel in which an irregular artifact could occur. Here, an example in which the evaluation value is calculated for the Gr channel of the high-resolution combined image will be described. As shown in FIG. 5, the pixel-of-interest position is assumed to be Gr44. In addition, the example will be described assuming that the edge-direction information of the pixel-of-interest position is determined to be the vertical direction (e3 direction in FIG. 4B).

The evaluation-value calculating portion 131 first calculates the correlation by using the following expression by using the pixel-of-interest Gr44 and pixels Gr34 and Gr54 that are adjacent thereto in the vertical direction. With this expression, the absolute difference value is obtained for each of the adjacent pixels, and a correlation value (first correlation value) V1 is obtained by averaging those values.

$$V1=(|Gr44-Gr34|+|Gr44-Gr54|)/2$$

The evaluation-value calculating portion 131 subsequently calculates a correlation value (second correlation value) V2 by using the following expression by using pixels Gr04 and Gr84 that are separated from the pixel-of-interest Gr44 by four pixels in the vertical direction.

$$V2=(|Gr44-Gr04|+|Gr44-Gr84|)/2$$

Here, the pixels positioned four pixels away are used in the calculation, because, in the case in which a high-resolution image is generated, which has twice the number of pixels vertically and horizontally with respect to the original eight images, as shown in FIG. 2A, pixels Gr1 are placed in a four-pixel cycle when focusing on the placement of the pixels Gr1 in one specific image (for example, a first Gr image), and thus, if a positioning error occurs in the one specific image, pixels containing the error appear in a four-pixel cycle.

Similarly, with this expression, the absolute difference values are obtained for the individual pixels positioned four pixels away, and the correlation value is obtained by averaging those values.

Then, the evaluation-value calculating portion 131 calculates an evaluation value Eva by using the following expression by using the thus-calculated correlation values V1 and V2.

$$Eva=V1-V2$$

This expression indicates that the likelihood of the pixel-of-interest being a pixel in which an irregular artifact could occur increases with an increase in the value of the evaluation value Eva, and the likelihood of the pixel-of-interest being a pixel in which an irregular artifact could occur decreases with a decrease in the value of the evaluation value Eva. The thus-calculated evaluation value Eva is output to the image-correcting portion 14.

The image-correcting portion 14 corrects an image by using the high-resolution combined image input from the frame memory 104.

First, a high-resolution correction image is corrected by applying, to the high-resolution combined image, a direction filter corresponding to the direction indicated by the edge-direction information output from the positioning-error evaluating portion 13. For example, as shown in FIGS. 6A to 6E, direction filters are applied such that four pixels along edge directions centered on the pixel-of-interest are multiplied by coefficients.

Next, the image-correcting portion 14 combines, at combining ratios based on the evaluation value Eva, the high-resolution combined image with the high-resolution correction image in which filters are applied to the individual pixels. For example, the evaluation value Eva is converted to the combining ratios in accordance with the bent lines shown in FIG. 7. Because the possibility of a pixel causing an irregular artifact increases with an increase in the evaluation value Eva, the ratio of the high-resolution correction image is set so as to be increased in such a case, and the ratio of the high-resolution correction image is set so as to be decreased (the ratio of the uncorrected high-resolution combined image is set so as to be increased) with a decrease in the evaluation value Eva.

The solid line in FIG. 7 represents the combining ratio of the high-resolution image, and the broken line represents the combining ratio of the high-resolution correction image. In addition, a first threshold TH1 and a second threshold TH2 are set, and the conversion is performed such that the combining ratio of the high-resolution combined image is set to 1 (the combining ratio of the high-resolution correction image is set to 0) if the evaluation value Eva is equal to or less than the first threshold TH1, the combining ratio of the high-resolution combined image is set to 0 (the combining ratio of the high-resolution correction image is set to 1) if the evaluation value Eva is equal to or greater than the second threshold TH2, and, in the region therebetween, the combining ratio of the high-resolution correction image is increased with an increase in the evaluation value Eva.

The high-resolution combined image and the high-resolution correction image are combined by converting the evaluation value Eva to the combining ratio for each pixel, and thus, it is possible to generate a high-resolution combined image in which irregular artifacts are corrected.

The image-processing method employing the thus-configured image-processing apparatus 1 according to this embodiment will be described below.

Figure 8:
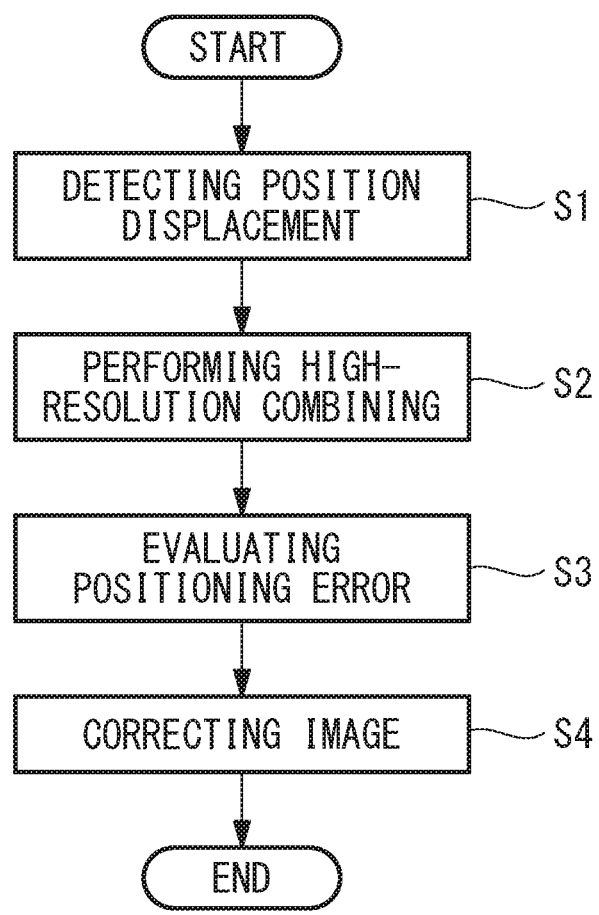
FIG. 8 is a flowchart showing an image-processing method employing the image-processing apparatus in FIG. 1.

As shown in FIG. 8, the image-processing method according to this embodiment includes: a positional-displacement detecting step S1 of detecting, by means of the positional-displacement detecting portion 11, positional-displacement amounts among the plurality of low-resolution images including the standard image and at least one reference image acquired by the image-acquisition portion 10 while shifting the position of the imaging device 101; a high-resolution combining step S2 of generating, by means of the high-resolution combining portion 12, a high-resolution combined image in which the pixel information of the reference images is positioned at the standard-image positions on the basis of the detected positional-displacement amounts and combined in the high-resolution image space; a positioning-error evaluating step S3 of calculating, by means of the positioning-error evaluating portion 13 when generating the high-resolution combined image, the evaluation value Eva for evaluating the positioning error caused by a resolution-enhancement magnification when positioning the reference images in the high-resolution image space; and an image correcting step S4 of correcting the high-resolution combined image on the basis of the calculated evaluation value Eva.

The effects of the image-processing apparatus 1 and image-processing method according to this embodiment will be described by using specific value examples in FIG. 9. FIG. 9 shows an example of the Gr channel of the high-resolution combined image in which the pixel information of the plurality of low-resolution images captured while the imaging device 101 is shifted by the sensor-shift controlling portion 103 is placed in the high-resolution image space on the basis of the positional-displacement amounts, and in which interpolation processing has been applied to empty pixels thereof.

FIG. 9 shows an image of an edge portion including positioning errors. In FIG. 9, a case in which whether or not a pixel-of-interest 200 could cause an irregular artifact is determined will be described. First, by using a 3×3 region centered on the pixel-of-interest 200, the edge directions re-calculated as the characteristic quantities as follows:

$$e1=|182-101|=81;$$

$$e2=|180-100|=80;$$

$$e3=|180-177|=3;\text{ and}$$

$$e4=|97-180|=83,$$

and thus, the edge direction is determined to be the vertical direction (e3 direction).

Next, by using the pixels that are adjacent to the pixel-of-interest 200 in the vertical direction and the pixels that are separated therefrom by four pixels in the vertical direction, the correlation values V1 and V2 are calculated as below:

$$V1=(|100-177|+|100-180|)/2=78.5;\text{ and}$$

$$V2=(|100-100|+|100-101|)/2=0.5.$$

By using these values, the evaluation value Eva for evaluating whether or not the pixel-of-interest 200 is a pixel that causes an irregular artifact is calculated as follows:

$$Eva=V1-V2=78.5-0.5=78.$$

Next, as a result of the image-correcting portion 14 applying the direction filter for the vertical direction shown in FIG. 6C to the pixel-of-interest 200, a corrected pixel value Ic is calculated as follows:

$$Ic=(179+177+180+181)/4=179.$$

Next, the combining ratios of the original pixel value I and corrected pixel value Ic are obtained on the basis of the calculated evaluation value Eva. Assuming that the thresholds TH1 and TH2 are such that the threshold TH1=20 and the threshold TH2=80, when converting the evaluation value Eva shown in FIG. 7 to combining ratios, a combining ratio α of the corrected pixel value Ic is such that:

$$\alpha=(Eva-TH1)/(TH2-TH1)=(78-20)/(80-20)=0.97.$$

As a result, a final pixel value I' of the pixel-of-interest 200 is such that:

$$I'=(1-\alpha)\times I+\alpha\times Ic=0.03\times100+0.97\times179=177.$$

In other words, with the image-processing apparatus 1 and the image-processing method according to this embodiment, it is clear that the corrected pixel value I' of the pixel-of-interest 200 is corrected so as to be nearly equivalent to the pixel values of the pixels that are adjacent thereto in the vertical direction, and thus, the irregular artifact is appropriately corrected.

Figure 10:
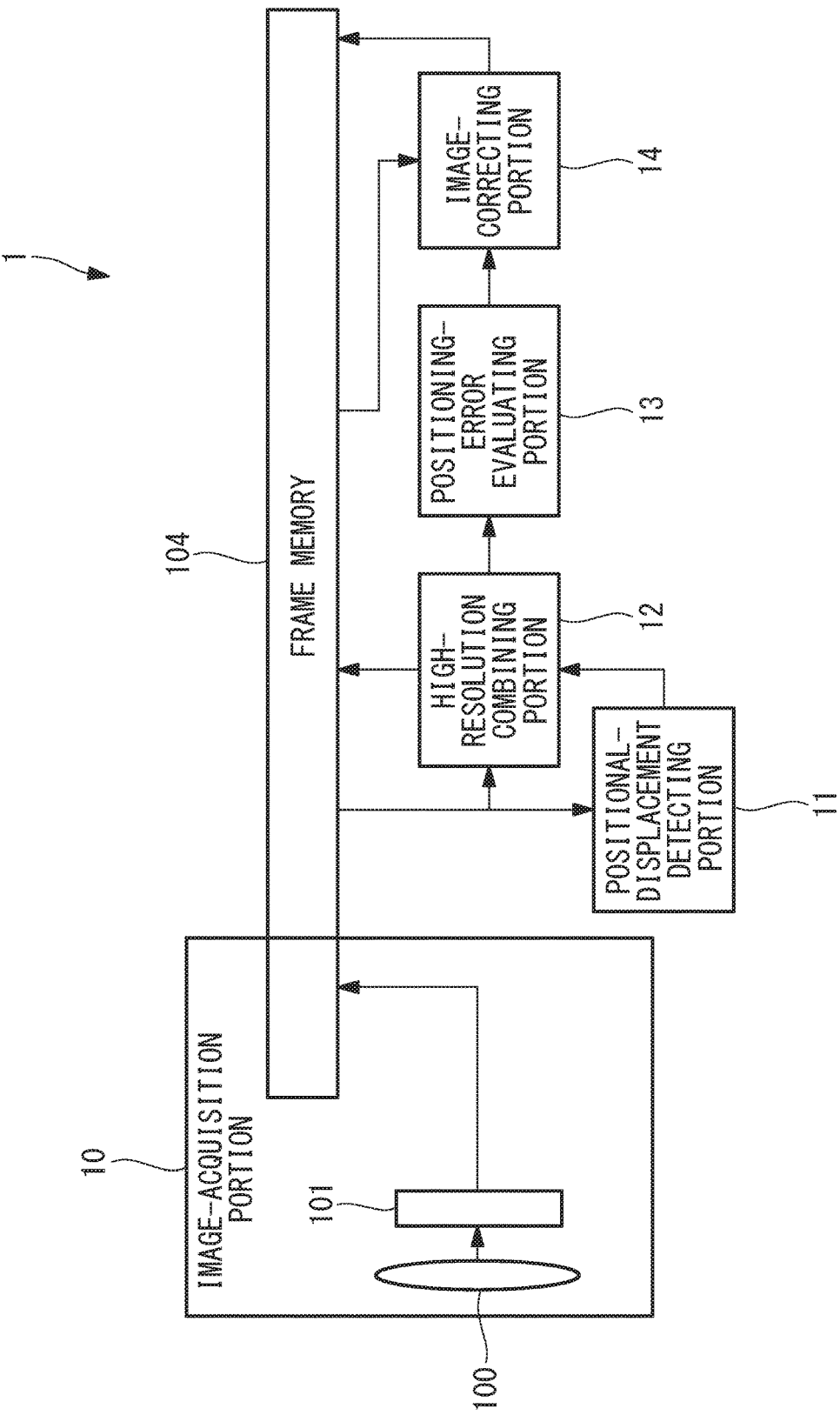
FIG. 10 is an overall configuration diagram showing a modification of the image-processing apparatus in FIG. 1.

Note that, in the image-processing apparatus 1 according to this embodiment, the positional-displacement detecting portion 11 calculates the positional-displacement amounts on the basis of the information about the shifting directions and the shifting amounts of the imaging device 101 transmitted from the sensor-shift controlling portion 103 provided in the image-acquisition portion 10. Alternatively, as shown in FIG. 10, the positional-displacement detecting portion 11 may detect: global motion amounts for the entire images among the low-resolution images by using the plurality of low-resolution images saved in the frame memory 104; or positional-displacement amounts by calculating local motion amounts for the individual regions.

For example, for each of divided regions in which one block is 32×32 pixels, motion vectors in the horizontal direction and vertical direction may be acquired by using a block matching method or the like, and sub-pixel-precision motion information may be estimated on the basis of a distribution of matching-error evaluation values. In addition, the motion information to be acquired and estimated may be not only the motions in the horizontal direction and vertical direction, but also changes in rotating directions and magnification/contraction, and, for example, the motion amounts at the individual pixel positions may be detected by estimating geometric deformation of the entire image on the basis of the motion information estimated at sub-pixel precision.

In addition, a determination indicating "no direction" may be given as the edge-direction information in consideration of the values of the edge directions e1, e2, e3, and e4 and the distribution thereof. In addition, the method for calculating the direction information and the number of directions is not limited to the above-described method, and another method may be employed. For example, the edge direction may be acquired by calculating the magnitude and direction of the slope on the basis of differential filters in the horizontal direction and the vertical direction, or the edge direction may be calculated after reducing the influence of noise by applying a smoothing filter.

In addition, any filter may be employed as the direction filter, so long as the filter has a direction-dependent filter coefficient. In addition, although the coefficient of the pixel-of-interest 200 is set to 0 in the above-described example, the coefficient needs not be 0. In addition, in the case in which direction information is "no direction", the coefficient 1 (practically no correction) may be applied only to the pixel-of-interest 200 as in FIG. 6E, or a non-direction-dependent filter such as a Gaussian filter may be applied.

In addition, in this embodiment, although the evaluation value Eva is calculated by using the pixels that are adjacent to the pixel-of-interest 200 on both sides thereof along the edge direction and the pixels that are separated therefrom by four pixels on both sides, the evaluation value Eva may be calculated by using only the pixels on one side along the edge direction or by using pixels in a larger area. In addition, the correlation value V1 may be calculated by using not only the adjacent pixels, but also pixels positioned two pixels away.

In addition, in this embodiment, although the case in which the image-processing apparatus 1 is configured by using hardware has been described, the image-processing apparatus 1 may be configured in the form of software by using an image-processing program with which it is possible to cause a computer to execute the individual steps of the above-described image-processing method.

Next, an image-processing apparatus according to a second embodiment of the present invention will be described below with reference to the drawings.

The image-processing apparatus according to this embodiment differs from the image-processing apparatus 1 according to the first embodiment in terms of the evaluation-value calculating portion 131.

In the evaluation-value calculating portion 131 of the image-processing apparatus according to this embodiment, the evaluation value Eva is calculated by using the Gr channel and the Gb channel of the high-resolution combined image output from the high-resolution combining portion 12.

As shown in FIGS. 11A and 11B, the pixels-of-interest are Gr44 and Gb44 in the Gr channel and the Gb channel.

A description will be given by assuming that, in the characteristic-quantity calculating portion 130, the edge direction at the pixel-of-interest position has been determined to be the vertical direction (e3 direction in FIG. 4B).

When calculating a sum of absolute differences (SAD) by using, as a processing unit, 9×9 pixels centered on the pixels-of-interest Gr44 and Gb44 of the Gr channel and the Gb channel, the weight of the absolute difference value (|Gr44−Gb44|) at the pixel-of-interest position and the weights of the absolute difference values (|Gr04−Gb04| and |Gr84−Gb84|) of the pixels Gr04, Gr84, Gb04, and Gb84 positioned four pixels away from the pixels-of-interest Gr44 and Gb4 4 are set to be greater than the weights of the absolute difference values at other pixel positions.

Such a method is employed, because the pixel cycle is four in the case in which the high-resolution image having twice the number of pixels vertically and horizontally with respect to the original eight images is generated. The pixel cycle becomes four because, as with the description given in the first embodiment, when a positioning error occurs in one specific image, pixels including the error tend to appear in a four-pixel cycle.

FIGS. 12A, 12B, 13A and 13B show specific example values.

Figure 12A:
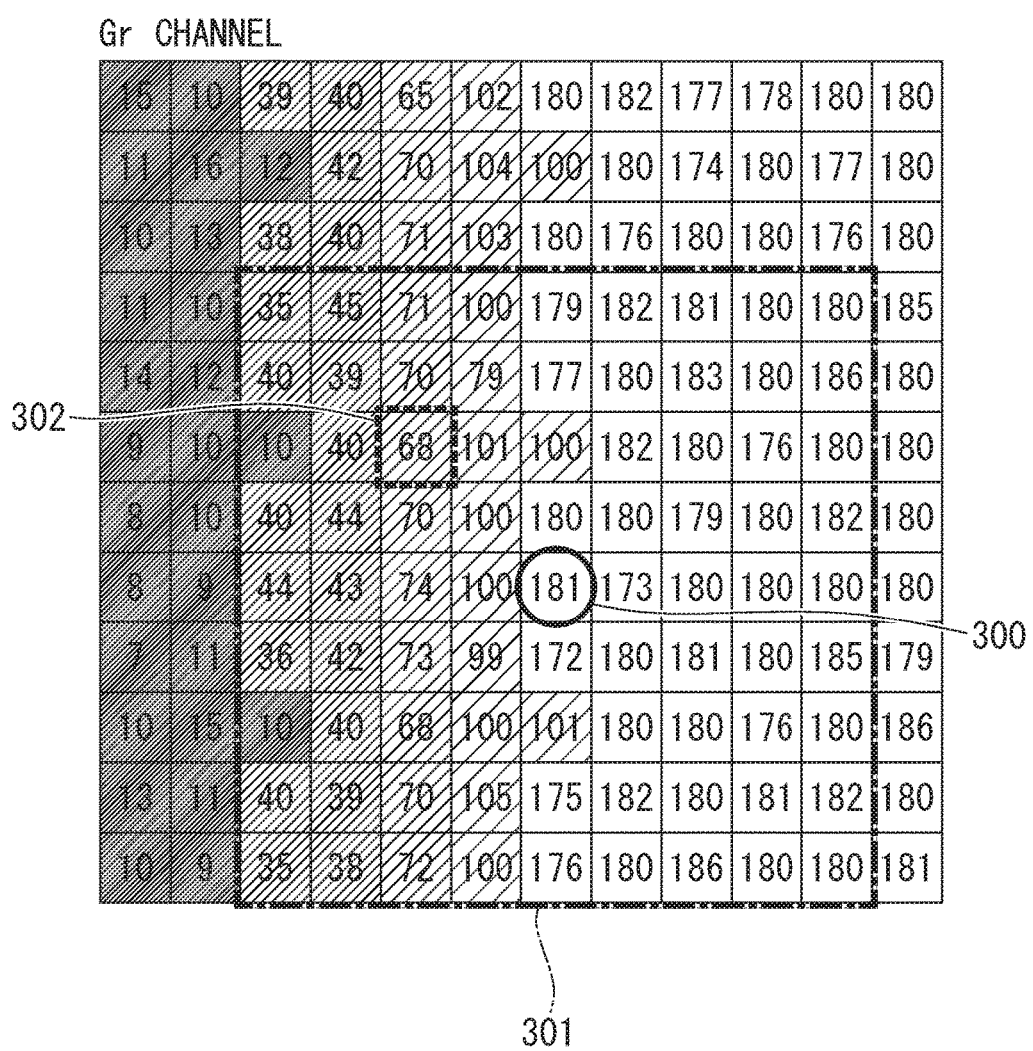
FIG. 12A is a diagram showing a Gr-channel high-resolution combined image in which interpolation processing has been applied to empty pixels in eight images placed in a high-resolution image space on the basis of positional-displacement amounts thereof.

FIGS. 12A and 12B show example images: that are the Gr channel and the Gb channel of the high-resolution combined image in which the eight images are placed in the high-resolution image space on the basis of the positional-displacement amounts and in which interpolation processing has been applied at the empty pixels thereof; and that are images of edge portions including positioning errors.

The irregular patterns in the Gr channel and the Gb channel are shifted by two pixels therebetween, because the captured images are Bayer images, and the capturing order (pixel-value acquisition timings) for the individual channels is different even if the coordinate positions are the same.

In this example, FIG. 13A shows the result of calculating the SAD by using a 9×9-pixel region 301 centered on a pixel-of-interest 300 in accordance with the conventional method. In FIG. 13A, pixel positions at which it is not possible to calculate the 9×9-pixel SAD are omitted. In FIG. 13A, the value of the SAD at a pixel 302 which includes no positioning error is greater than that of the SAD at the pixel 300 which includes a positioning error.

Because of this, in order to apply correction processing, by means of the image-correcting portion 14, to the pixel 300 at which an irregular artifact may occur, it is necessary to apply correction processing also to the pixel 302 at which no irregular artifact occurs, and thus, the resolution-enhancement effect is reduced.

In contrast, if correction processing is not applied to the pixel 302, correction processing is not applied to the pixel 300 either, and thus, irregular artifacts occur in the combined image. In this way, it is not possible to achieve both the resolution-enhancement effect and artifact suppression.

In contrast, with this embodiment, because the contributions of pixels that are positioned so as to be separated by a number of pixels (four pixels in this example) determined in accordance with the resolution-enhancement magnification (two-times in this example) is increased, as shown in FIG. 13B, the SAD at the pixel 300 takes a greater value than those at other pixels, and thus, there is an advantage in that it is possible to easily determine that the pixel 300 may cause an irregular artifact.

Note that, with these values, although the evaluation value Eva is calculated by setting the weights at the pixel-of-interest 300 and at positions that are separated from the pixel-of-interest 300 by four pixel to be four times greater than the weights at other positions, the allocation of the weights is not limited thereto.

In addition, although the first and second embodiments have been described in terms of examples in which a high-resolution image that is vertically and horizontally magnified by two times is generated by using the plurality of images captured by shifting the imaging device 101 by means of the sensor-shift controlling portion 103, the magnification-enhancement magnification is not limited to two-times. In addition, the imaging device 101 may be of a complementary color system instead of the RGB Bayer system.

As has been described above, with the image-processing apparatus 1, the image-processing method, and the image-processing program according to the above-described individual embodiments, in the positioning-error evaluation for determining whether or not the pixel-of-interest is a pixel in which an irregular artifact could occur, because the evaluation value Eva is calculated on the basis of the information indicating whether or not the pixel in question is a pixel that falls within the pixel cycle determined by the resolution-enhancement magnification used when enhancing the resolutions of the original low-resolution images, it is possible to appropriately determine only the pixels in which artifacts could occur, and to apply correction processing thereto. In other words, there is an advantage in that it is possible to achieve both the resolution-enhancement effect and suppression of the occurrence of an artifact, which has been difficult with the conventional method.

As a result, the above-described embodiments also lead to the following aspects.

An aspect of the present invention is an image-processing apparatus including: a positional-displacement detecting portion that detects a positional-displacement amount between a plurality of low-resolution images including a standard image and at least one reference image that are acquired in a time series; a high-resolution combining portion that generates a high-resolution combined image by positioning, on the basis of the positional-displacement amount detected by the positional-displacement detecting portion, pixel information of the reference image at a standard-image position and by performing combining thereof in a high-resolution image space; a positioning-error evaluating portion that evaluates a positioning error caused by a resolution-enhancement magnification used when positioning the reference image in the high-resolution image space when generating the high-resolution combined image by means of the high-resolution combining portion; and an image-correcting portion that corrects the high-resolution combined image on the basis of the evaluation result by the positioning-error evaluating portion.

With this aspect, when the plurality of low-resolution images including the standard image and at least one reference image that are acquired in a time series are input, the positional-displacement amount between the input low-resolution images is detected by the positional-displacement detecting portion, the pixel information of the reference image is positioned at the standard-image position in the high-resolution image space on the basis of the detected positional-displacement amount, and combining thereof is performed by the high-resolution combining portion. When the combined high-resolution combined image is input to the positioning-error evaluating portion, the positioning error caused by the resolution-enhancement magnification used when positioning the reference image in the high-resolution image space is evaluated, and the image-correcting portion corrects the high-resolution combined image on the basis of the evaluation result.

In other words, because the positioning error used to correct the high-resolution combined image is caused by the resolution-enhancement magnification, by performing the evaluation on the basis of the information indicating whether or not a pixel in question falls within the pixel cycle determined by the resolution-enhancement magnification used when enhancing the resolutions of the original low-resolution images, it is possible to appropriately determine only the pixels in which artifact could occur, and to apply correction processing thereto.

The above-described aspect may be provided with an image-acquisition portion that acquires the plurality of low-resolution images in a time series, wherein the image-acquisition portion may be provided with an optical system that collects light coming from an imaging subject, an imaging device that acquires the individual low-resolution images by acquiring images of the light collected by the optical system, a sensor shifting mechanism that shifts a relative position of the optical system and imaging device in a direction that intersects the optical-axis direction, and a sensor-shift controller that controls a shifting direction and a shifting amount achieved by the sensor shifting mechanism.

In addition, in the above-described aspect, the positional-displacement detecting portion may detect a positional-displacement amount between the low-resolution images on the basis of the shifting direction and shifting amount controlled by the sensor-shift controller.

In addition, in the above-described aspect, the positional-displacement detecting portion may calculate a positional-displacement amount between the low-resolution images on the basis of the standard image and the reference image.

In addition, in the above-described aspect, the high-resolution combining portion may perform, on the basis of the pixel information placed in the high-resolution space, interpolation of pixels at which the pixel information is not placed.

In addition, in the above-described aspect, the positioning-error evaluating portion may be provided with a characteristic-quantity calculating portion that calculates a characteristic quantity of a region that includes an arbitrary pixel-of-interest in the high-resolution combined image, and an evaluation-value calculating portion that calculates an error evaluation value of the pixel-of-interest by using the characteristic quantity calculated by the characteristic-quantity calculating portion and the high-resolution combined image.

In addition, in the above-described aspect, the characteristic-quantity calculating portion may calculate the characteristic quantity in the form of edge-direction information for the region in the high-resolution combined image.

In addition, in the above-described aspect, the evaluation-value calculating portion may calculate the error evaluation value on the basis of information indicating whether or not, in the region including the pixel-of-interest, a subject pixel for computing the error evaluation value falls within a pixel cycle determined by a resolution-enhancement magnification.

In addition, in the above-described aspect, when the resolution-enhancement magnification is M (M is a natural number), the evaluation-value calculating portion may calculate the error evaluation value at the pixel-of-interest position by using a first correlation value between at least one pixel positioned 2M pixels away from the pixel-of-interest and the pixel-of-interest, and a second correlation value between at least one pixel positioned at other positions and the pixel-of-interest.

In addition, in the above-described aspect, when the resolution-enhancement magnification is M (M is a natural number), the evaluation-value calculating portion may use, as the error evaluation value at the pixel-of-interest position, the result of computing a correlation by setting contributions of the pixel-of-interest and pixel positioned 2M pixels away from the pixel-of-interest so as to be greater than contributions of pixels positioned at other positions.

In addition, in the above-described aspect, the image-correcting portion may generate a high-resolution correction image by applying a filter to the high-resolution combined image on the basis of the evaluation result obtained by the positioning-error evaluating portion.

In addition, in the above-described aspect, the image-correcting portion may combine the high-resolution combined image and the high-resolution correction image in accordance with combining ratios based on the evaluation result.

In addition, another aspect of the present invention is an image-processing method including: a positional-displacement detecting step of detecting a positional-displacement amount between a plurality of low-resolution images including a standard image and at least one reference image that are acquired in a time series; a high-resolution combining step of generating a high-resolution combined image by positioning, on the basis of the positional-displacement amount detected in the positional-displacement detecting step, pixel information of the reference image at a standard-image position and by performing combining thereof in a high-resolution image space; a positioning-error evaluating step of evaluating a positioning error caused by a resolution-enhancement magnification used when positioning the reference image in the high-resolution image space when generating the high-resolution combined image in the high-resolution combining step; and an image-correcting step of correcting the high-resolution combined image on the basis of the evaluation result in the positioning-error evaluating step.

In addition, another aspect of the present invention is an image-processing program that causes a computer to execute: a positional-displacement detecting step of detecting a positional-displacement amount between a plurality of low-resolution images including a standard image and at least one reference image that are acquired in a time series; a high-resolution combining step of generating a high-resolution combined image by positioning, on the basis of the positional-displacement amount detected in the positional-displacement detecting step, pixel information of the reference image at a standard-image position and by performing combining thereof in a high-resolution image space; a positioning-error evaluating step of evaluating a positioning error caused by a resolution-enhancement magnification used when positioning the reference image in the high-resolution image space when generating the high-resolution combined image in the high-resolution combining step; and an image correcting step of correcting the high-resolution combined image on the basis of the evaluation result in the positioning-error evaluating step.

REFERENCE SIGNS LIST 1 image-processing apparatus
10 image-acquisition portion
11 positional-displacement detecting portion
12 high-resolution combining portion
13 positioning-error evaluating portion
14 image-correcting portion 100 imaging lens (optical system)
101 imaging device
102 sensor shifting mechanism
103 sensor-shift controlling portion
130 characteristic-quantity calculating portion
131 evaluation-value calculating portion
200, 300 pixel-of-interest
Eva evaluation value (error evaluation value)
V1 correlation value (first correlation value)
V2 correlation value (second correlation value)
S1 positional-displacement detecting step
S2 high-resolution combining step
S3 positioning-error evaluating step
S4 image correcting step

The invention claimed is:

1. An image-processing apparatus comprising:
a computer, wherein the computer is configured to:
detect a positional-displacement amount between a plurality of low-resolution images including a standard image and at least one reference image that are acquired in a time series;
generate a high-resolution combined image by positioning, on the basis of the positional-displacement amount detected, pixel information of the reference image at a standard-image position and by performing combining thereof in a high-resolution image space;
evaluate a positioning error caused by a resolution-enhancement magnification used when positioning the reference image in the high-resolution image space when generating the high-resolution combined image; and
correct the high-resolution combined image on the basis of the evaluation result,
wherein the correcting of the high-resolution combined image combines a high-resolution correction image generated by applying a filter to the high-resolution combined image on the basis of the evaluation result obtained, and the high-resolution combined image in accordance with combining ratios based on the evaluation result.

2. The image-processing apparatus according to claim 1, further comprising:
an image-acquisition portion that acquires the plurality of low-resolution images in a time series,
wherein the image-acquisition portion is provided with an optical system that collects light coming from an imaging subject, an imaging device that acquires the individual low-resolution images by acquiring images of the light collected by the optical system, a sensor shifting mechanism that shifts a relative position of the optical system and imaging device in a direction that intersects the optical-axis direction, and a sensor-shift controller that controls a shifting direction and a shifting amount achieved by the sensor shifting mechanism.

3. The image-processing apparatus according to claim 2, wherein the detecting of the positional-displacement amount detects a positional-displacement amount between the low-resolution images on the basis of the shifting direction and the shifting amount controlled by the sensor-shift controller.

4. The image-processing apparatus according to claim 1, wherein the detecting of the positional-displacement amount calculates a positional-displacement amount between the low-resolution images on the basis of the standard image and the at least one reference image.

5. The image-processing apparatus according to claim 1, wherein the generating of the high-resolution combined image performs, on the basis of the pixel information placed in the high-resolution space, interpolation of pixels at which the pixel information is not placed.

6. The image-processing apparatus according to claim 1, wherein the evaluating of the positioning error includes:
calculating a characteristic quantity of a region that includes an arbitrary pixel-of-interest in the high-resolution combined image, and
calculating an error evaluation value of the pixel-of-interest by using the calculated characteristic quantity and the high-resolution combined image.

7. The image-processing apparatus according to claim 6, wherein the calculating of the characteristic quantity calculates the characteristic quantity in the form of edge-direction information for the region in the high-resolution combined image.

8. The image-processing apparatus according to claim 6, wherein the calculating of the error evaluation value calculates the error evaluation value on the basis of information indicating whether or not, in the region including the pixel-of-interest, a subject pixel for computing the error evaluation value falls within a pixel cycle determined by the resolution-enhancement magnification.

9. The image-processing apparatus according to claim 8, wherein, when the resolution-enhancement magnification is M (M is a natural number), the calculating of the error evaluation value calculates the error evaluation value at the pixel-of-interest position by using a first correlation value between at least one pixel positioned 2M pixels away from the pixel-of-interest and the pixel-of-interest, and a second correlation value between at least one pixel positioned at other positions and the pixel-of-interest.

10. The image-processing apparatus according to claim 8, wherein, when the resolution-enhancement magnification is M (M is a natural number), the calculating of the error evaluation value uses, as the error evaluation value at the pixel-of-interest position, a result of computing a correlation by setting contributions of the pixel-of-interest and pixel positioned 2M pixels away from the pixel-of-interest so as to be greater than contributions of pixels positioned at other positions.

11. An image-processing method comprising:
a positional-displacement detecting step of detecting a positional-displacement amount between a plurality of low-resolution images including a standard image and at least one reference image that are acquired in a time series;
a high-resolution combining step of generating a high-resolution combined image by positioning, on the basis of the positional-displacement amount detected in the positional-displacement detecting step, pixel information of the reference image at a standard-image position and by performing combining thereof in a high-resolution image space;
a positioning-error evaluating step of evaluating a positioning error caused by a resolution-enhancement magnification used when positioning the reference image in the high-resolution image space when generating the high-resolution combined image in the high-resolution combining step; and
an image-correcting step of correcting the high-resolution combined image on the basis of the evaluation result in the positioning-error evaluating step,
wherein, in the image-correcting step, a high-resolution correction image generated by applying a filter to the high-resolution combined image on the basis of the evaluation result obtained in the positioning-error evaluating step, and the high-resolution combined image are combined in accordance with combining ratios based on the evaluation result.

12. A non-transitory computer readable medium storing an image-processing program that causes a computer to execute image processing comprising:
   a positional-displacement detecting step of detecting a positional-displacement amount between a plurality of low-resolution images including a standard image and at least one reference image that are acquired in a time series;
   a high-resolution combining step of generating a high-resolution combined image by positioning, on the basis of the positional-displacement amount detected in the positional-displacement detecting step, pixel information of the reference image at a standard-image position and by performing combining thereof in a high-resolution image space;
   a positioning-error evaluating step of evaluating a positioning error caused by a resolution-enhancement magnification used when positioning the reference image in the high-resolution image space when generating the high-resolution combined image in the high-resolution combining step; and
   an image correcting step of correcting the high-resolution combined image on the basis of the evaluation result in the positioning-error evaluating step,
   wherein, in the image-correcting step, a high-resolution correction image generated by applying a filter to the high-resolution combined image on the basis of the evaluation result obtained in the positioning-error evaluating step, and the high-resolution combined image are combined in accordance with combining ratios based on the evaluation result.

* * * * *